United States Patent [19]
Brigham et al.

[11] Patent Number: 5,222,696
[45] Date of Patent: Jun. 29, 1993

[54] FLAMELESS DEICER

[75] Inventors: William D. Brigham, Huntington Beach; Dinh D. Nguyen, Orange City, both of Calif.

[73] Assignee: Zwick Energy Research Organization, Inc., Huntington Beach, Calif.

[21] Appl. No.: 837,447

[22] Filed: Feb. 14, 1992

Related U.S. Application Data

[63] Continuation of Ser. No. 72,123, Jul. 10, 1987, Pat. No. 5,098,036, which is a continuation-in-part of Ser. No. 924,989, Oct. 30, 1986, abandoned.

[51] Int. Cl.$^5$ .............................................. B64D 15/02
[52] U.S. Cl. ................................................ 244/134 R
[58] Field of Search ................. 244/134, 117 A, 57; 60/428-430; 123/41.1; 239/165, 135, 172, 130, 131; 122/26; 237/1 R, 2 R, 12.1, 12.3; 15/321, 340.1; 62/50.3; 134/101, 105, 33; 163/32

[56] References Cited

U.S. PATENT DOCUMENTS

| | | | |
|---|---|---|---|
| 2,764,147 | 9/1956 | Brunner | 244/134 R |
| 3,243,123 | 3/1966 | Inghram et al. | 244/134 R |
| 3,276,517 | 10/1966 | Lowe | 244/134 R |
| 3,813,036 | 5/1974 | Cutz | 244/134 R |
| 4,109,340 | 8/1978 | Bates | 244/134 R |
| 4,191,348 | 3/1980 | Halwerda | 244/134 R |
| 4,197,712 | 4/1980 | Zwick et al. | 244/134 R |
| 4,264,826 | 4/1981 | Ullmann | 244/134 R |
| 4,344,567 | 8/1982 | Howe | 244/134 R |
| 4,728,029 | 3/1988 | Griebel et al. | 244/134 R |

Primary Examiner—Galen Barefoot
Attorney, Agent, or Firm—Beehler & Pavitt

[57] ABSTRACT

A single nonfired heat source, such as a diesel engine, drives a hydraulic pump. The hydraulic pump in turn is coupled in a hydraulic circuit with a back-pressure valve which loads the hydraulic pump and hence the diesel engine. The engine also circulates a heat exchanging fluid, such as engine coolant through a second circuit. Water or engine coolant is circulated through the second circuit by means of a pump driven by the diesel engine. An exhaust gas heat exchanger coupled to the exhaust gases from the engine may also be included within the water coolant, the exhaust gases or both, and is then transferred to noncirculating deicing fluid in a storage tank. Heat developed within the hydraulic circuit which loads the engine is also transferred to the noncirculating fluid in the storage tank. The heated noncirculating fluid may be gently stirred to increase heat exchange efficiency and then either pumped directly to the utilization site from the storage tank or pumped in a single pass through a heat exchanger thermally coupled through the water coolant heat exchanger, hydraulic heat exchanger, or both, and thence to the utilization site.

23 Claims, 6 Drawing Sheets

FLAMELESS DEICER

BACKGROUND OF THE INVENTION

This application is a continuation of application Ser. No. 07/072,123 filed on Jul. 10, 1987, now issued as U.S. Pat. No. 5,098,036, which in turn was a continuation-in-part application of application Ser. No. 04/924,989 filed Oct. 30, 1986, now abandoned.

1. Field of the Invention

The invention relates to equipment used for deicing objects or structures, and in particular to ground equipment for deicing aircraft and aircraft wings.

2. Description of the Prior Art

A deicer is a ground unit used at an airfield which is generally, but not necessarily, mobile, and which carries a tank filled with water and another filled with deicing fluid, typically a glycol. The water and the glycol are mixed on the unit at the time of delivery of the mixture. In some prior art units the constituents of the deicing fluid are premixed. In the units using non-premixed constituents in the deicing fluid, the water and possibly the glycol are heated to approximately 140 degrees F., and maintained at that temperature within the storage tank. Typically, a mobile unit includes a tank of deicing fluid of approximately 1000 to 250 gallons capacity. Given the capacity of the heating units on such mobile structures, which are typically fired or combustion units, approximately one-half hour is required to heat the 250 gallon tank to 140 degrees F. The time required to heat the fluid to the storage temperature will depend on the size of the heating unit and the amount of stored fluid.

When the deicer is to be used, it is moved to a landed aircraft whose wings are snow or ice burdened. The water and/or glycol is then heated an additional 40 degrees F., and sprayed on the airplane wing or structure. Typically, open-flame burners are used for heating the glycol water mixture to the 140 degree F. storage temperature, and then reheating the delivered glycol water mixture to the 180 degree F. delivery temperature. The size of the heating unit to first heat the fluid to the 140 degree F. storage temperature within a prescribed time, and then to heat the fluid an additional 40 degrees F. to the 180 degree delivery temperature is a function of both the amount of fluid held in storage and the flow delivery rate. At the flow delivery rates used in the prior art, the size of the heating unit is usually determined by the flow delivery rate. Thus the heating unit is sized to provide the necessary heat input to boost the fluid to 180 degrees F. at the flow delivery rate.

Thus, prior art units typically utilize a burner, typically an open-flame burner. The presence of open-flame burners in the vicinity of aircraft is generally undesirable, and in some cases cannot be tolerated.

What is needed then, is an improved design for a deicing unit which is capable of operating without an open flame and with a smaller and more economical heating unit.

BRIEF SUMMARY OF THE INVENTION

What is described below are embodiments wherein the deicing fluid is noncirculating. A heat transfer fluid is circulated and thermally coupled with the deicing fluid. Various circulating embodiments are claimed in the copending parent application cited above which is incorporated herein by reference. In the circulating embodiments, the deicing fluid itself is circulated. The circulating embodiments will be described in the detailed description. Therefore, in the following brief summary, only the noncirculating embodiments will be described.

The invention is an apparatus for providing a heated deicing fluid comprising a nonfired heat source, a storage tank for storing the deicing fluid, and a heat exchanger for transferring heat from the heat source to the deicing fluid. Also included is a system for circulating a heat exchanging fluid from the nonfired heat source to the heat exchanger. As a result, the nonfired heat source is utilized in the apparatus as a single heat source wherein the deicing fluid is heated within the storage tank without requiring pumping of the deicing fluid in order to heat the deicing fluid in the apparatus.

The nonfired heat source comprises an internal combustion engine, hydraulic pump, hydraulic circuit, and back-pressure valve. The internal combustion engine drives the hydraulic pump. The hydraulic pump circulates the heat exchanging fluid within the hydraulic circuit. The heat exchanging fluid is pumped through the back-pressure valve within the hydraulic circuit. As a result, the internal combustion engine is loaded and a predetermined energy output is achieved.

In one embodiment the nonfired heat source comprises an internal combustion engine, a inefficient hydraulic load device, such as a dynamometer, and a fluidic circuit. The internal combustion engine drives the hydraulic load device. The hydraulic load device circulates the heat exchanging fluid within the fluidic circuit, so that the internal combustion engine is loaded and a predetermined energy output is achieved. Throughout this specification "fluidic circuit" shall generally include any circuit, open or closed, in which a fluid, typically including water as at least a constituent part, flows or is present. "Hydraulic circuit" shall generally mean a circuit, open or closed, in which some type of nonaqueous fluid flows or is present.

The invention can also be characterized as a method for supplying a thixotropic or noncirculating deicing fluid to a utilization site at a predetermined delivery temperature comprising the steps of recirculating a heat exchanging fluid through a heat exchanger within a storage tank, and heating the deicing fluid by the heat exchanging fluid which is recirculated through the heat exchanger. The deicing fluid is maintained at the storage temperature. The heat exchanging fluid is heated by a nonfired heat source.

The method further comprising the steps of reheating the deicing fluid in a single pass through the heat exchanger, which is in heat exchanging relationship with the heat exchanging fluid from the single heat source, to increase the temperature of the deicing fluid. The reheated deicing fluid is delivered to the utilization site at a delivery temperature. The delivery temperature is greater than the storage temperature by a temperature differential approximately equal to the increase of temperature of the deicing fluid acquired in a single pass through the heat exchanger during the step of heating.

In the step of heating the deicing fluid with the nonfired heat source, the deicing fluid is heated by heat rejection and shaft work from an internal combustion engine. The internal combustion engine is loaded to produce a predetermined amount of heat.

The engine may drive a hydraulic pump. The hydraulic pump circulates hydraulic fluid through a hydraulic circuit and back-pressure valve, and the engine is loaded by a predetermined setting on the back-pressure valve. In other embodiments there may be no hydraulic circuit or pump and the engine will be loaded by the heat transfer fluid itself driving an inefficient hydraulic load device.

In the step of heating the deicing fluid, the amount of heat transferred to the deicing fluid is varied from the single heat source so that the steps of recirculating and heating are repeated for a correspondingly varied period of time, and the delivery temperature is also correspondingly varied.

In the step of heating the deicing fluid by heat exchange with the heat exchanging fluid, the deicing fluid is heated by heat conduction with a heat exchanger to which the heat exchanging fluid flows. The heat exchanger is disposed within the storage tank.

In one embodiment in the step of heating the deicing fluid within the storage tank, the storage tank is gently stirred to circulate the deicing fluid in the tank in a heat exchanging relationship with the heat exchanger within the tank.

The nonfired heat source further comprises a heat exchanger through which the hydraulic fluid is circulated, and the method further comprises the step of coupling heat from the hydraulic heat exchanger into the heat exchanging fluid to transfer heat from the hydraulic circuit into the deicing fluid during the step of heating the deicing fluid. In other embodiments the hydraulic fluid directly serves as the heat exchanging fluid with the deicing fluid and there is no intermediary heat exchanging fluid.

The step of coupling the heat from the hydraulic heat exchanger is performed exterior of the storage tank in which the deicing fluid is stored.

In another embodiment, the step of coupling the heat from the hydraulic heat exchanger to the heat exchanging fluid is performed within the storage tank for storing the deicing fluid. In the step of heating the deicing fluid, heat is transferred to the deicing fluid directly from the hydraulic heat exchanger within the storage tank.

The invention is also a method for heating a noncirculating deicing fluid with an internal combustion engine including a water coolant system comprising the steps of storing the noncirculating deicing fluid within a storage tank, and driving a hydraulic pump by the engine. The hydraulic pump is loaded by a back-pressure valve to cause the engine to produce power at a predetermined level. Heat is coupled from the coolant system of the engine into the deicing fluid within the storage tank. Heat from hydraulic fluid pumped by the hydraulic pump is transferred into the deicing fluid within the storage tank. The hydraulic pump and back-pressure valve may be replaced or augmented by a fluidic load or inefficient hydraulic load device in the circuit of the heat transfer fluid.

The method further comprises the step of coupling heat from exhaust gas generated by the engine into the deicing fluid stored in the storage tank.

The invention is still further characterized as a nonfired system for heating a noncirculating deicing fluid comprising an internal combustion engine, a hydraulic pump driven by the engine, and a hydraulic circuit provided with recirculating hydraulic fluid by the hydraulic pump. A device is included within the hydraulic circuit for loading the hydraulic pump and hence the engine. A first heat exchanger transfers heat from the hydraulic fluid in the hydraulic circuit to the noncirculating deicing fluid. A second heat exchanger transfers heat from the engine to the noncirculating fluid in the storage tank. A storage tank stores the noncirculating fluid.

The noncirculating fluid stored within the storage tank is retained within the storage tank as heat is transferred thereinto.

The second heat exchanger comprises an engine coolant heat exchanger disposed in the storage tank.

The second heat exchanger also comprises an exhaust heat exchanger for transferring heat from gas exhaust from the engine into engine coolant. The engine coolant is provided to the engine coolant heat exchanger in the storage tank.

The first heat exchanger for transferring heat from the hydraulic fluid to the noncirculating deicing fluid comprises a heat exchanger for providing a heat exchanging relationship between the hydraulic fluid and the engine coolant. The engine coolant transfers heat picked up from the hydraulic fluid into the noncirculating deicing fluid through the second heat exchanger.

In one embodiment the first heat exchanger comprises a hydraulic heat exchanger disposed in the noncirculating fluid within the storage tank.

The invention and its various embodiments are best understood by now considering the following drawings wherein like numerals reference like elements.

Figure 1:
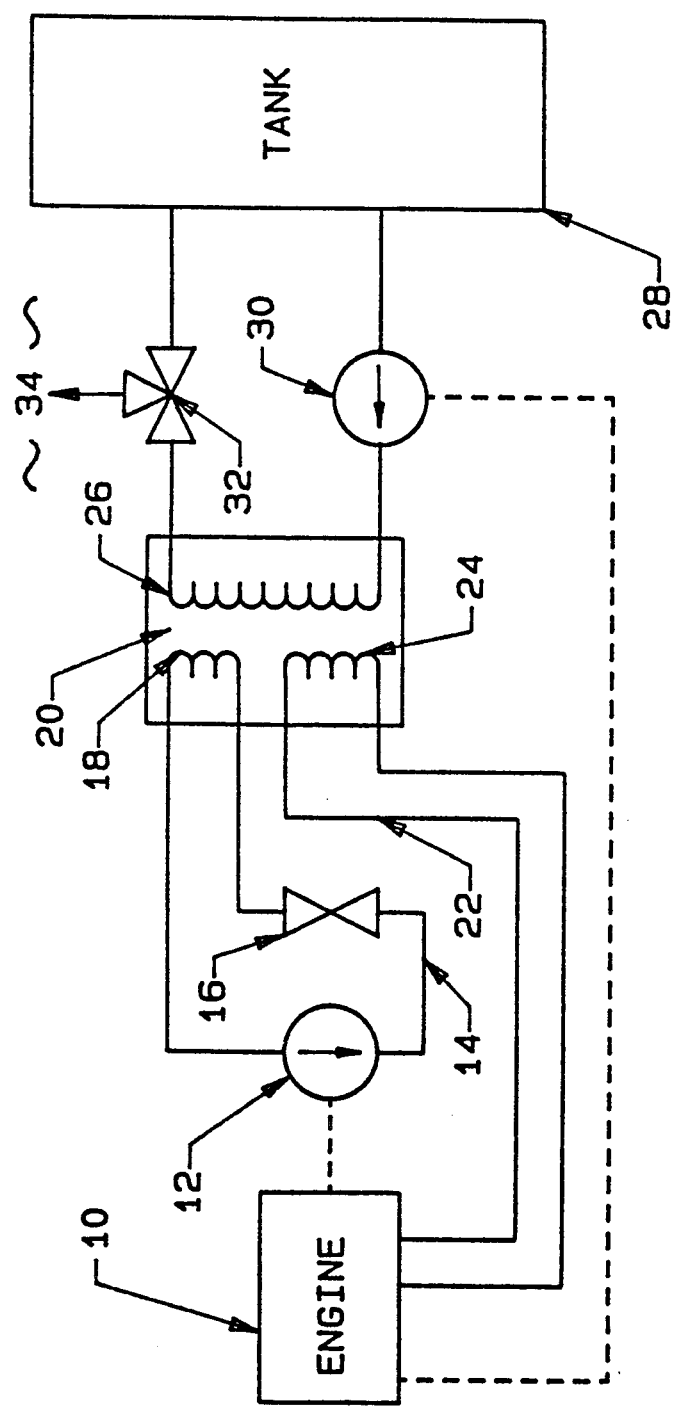
FIG. 1 is a highly simplified block diagram of a circulating deicer incorporating the invention whose performance is graphically depicted in FIG. 2.

The invention and its various embodiments may be better understood by now turning to the following detailed description.

DETAILED DESCRIPTION OF THE PREFERRED EMBODIMENTS

A single nonfired heat source, such as a diesel engine, drives a hydraulic pump. The hydraulic pump in turn is coupled in a hydraulic circuit with a back-pressure valve which loads the hydraulic pump and hence the diesel engine. The engine also circulates a heat exchanging fluid, such as engine coolant through a second circuit. Water or engine coolant is circulated through the second circuit by means of a pump driven by the diesel engine. An exhaust gas heat exchanger coupled to the exhaust gases from the engine may also be included within the water coolant circuit. Heat from the exhaust gas and/or engine coolant is then transferred to noncirculating deicing fluid in a storage tank. Heat developed within the hydraulic circuit which loads the engine is also transferred to the noncirculating fluid in the storage tank. The heated noncirculating fluid may be gently stirred to increase heat exchange efficiency and then either pumped directly to the utilization site from the storage tank or pumped in a single pass through a heat exchanger thermally coupled through the water coolant heat exchanger, hydraulic heat exchanger, or both, and thence to the utilization site.

The deicer of the illustrated embodiment uses a single heat source to heat a deicing fluid within the storage tank to a storage temperature, and then in a single pass through a heat exchanger, to deliver the deicing fluid to a utilization site at an elevated delivery temperature. In particular, what is considered is a nonfired system such as powered by the loaded diesel engine heating systems as disclosed in Zwick et. al., *Fluid Pumping and Heating System*, U.S. Pat. No. 4,197,712 (1980) assigned to the same assignee as the present invention. However, fired or open-flame heaters are also specifically included within the scope and spirit of the methodology of the present invention.

The preferred embodiment is a nonfired system which uses a diesel engine, which may also act as the power plant for the mobile unit which includes the deicer. It is also possible that the power plant for the mobile unit could include an additional combustion engine for motive power if desired, in which case the diesel engine discussed here acts as the heat source and drive unit only for the deicing functions.

The diesel engine drives a hydraulic pump through a closed loop. The pump is driven against the load of a back-pressure valve within the loop. As a result, the engine is required to work to produce a predetermined amount of horsepower or heat against the load as selectively determined by the setting of the back-pressure valve. The heat is then extracted from the water jacket of the diesel engine and, if necessary, from the hydraulic loop and circulated through a heat exchanger. It is also contemplated that waste heat recovery from the exhaust gases of the engine could be extracted. The stored deicing fluid from a storage tank (defined here to include water and/or glycol separately or as a mixture or to include other deicing mixtures and fluids) is also circulated through the same heat exchanger, and ultimately heated to a storage temperature.

The storage temperature is not necessarily 140 degrees F., or any specific numeric amount, but is a temperature determined according to the present invention as described below. The selected temperature depends upon system parameters, and is selected as follows.

Turn first to FIG. 1. FIG. 1 is a diagrammatic depiction of the preferred embodiment. An engine 10 drives a hydraulic pump 12. Pump 12 in turn pumps hydraulic fluid through a closed loop 14 against a back-pressure valve 16. Heat accumulated within hydraulic loop 14 flows through heat exchanging coil 18 within heat exchanger 20. Similarly, waste heat from engine 10, such as from the water jacket or from a heat exchanger in the engine exhaust, flows through a circulation loop 22 to a heat exchanging coil 24 within heat exchanger 20. Heat from coils 18 and 24 is absorbed by a deicing fluid flowing through heat exchanging coil 26. The deicing fluid is drawn from a storage tank 28 by means of a pump 30, also driven by engine 10. In the illustrated embodiment the deicing fluid will be considered as diagrammatically contained within a single storage tank 28. However, as previously discussed the use of a multiple number of tanks, such as one for water and a separate one for a deicing agent like glycol, will be considered as conceptually included within the diagrammatically depicted tank 28. Included within the conceptual depiction of tank 28 are such additional means as are well known for proportioning two or more fluids drawn from a corresponding number of tanks. Normally the deicing fluid is circulated through pump 30 to heat exchanging coil 28, and thence back through valve 32 to tank 28. Ultimately, the recirculated deicing fluid will reach a predetermined storage temperature within a predetermined time, depending upon the amount of heat absorbed by the deicing fluid in heat exchanging coil 26. This in turn is principally determined by the setting of back-pressure valve 16.

After the deicing fluid within tank 28 reaches the predetermined storage temperature, it is ready for delivery to the utilization site, which in the preferred embodiment is the snow or ice-burdened airfoils. Valve 32 is activated to then divert fluid from tank 28 to the utilization site, symbolically denoted by reference numeral 34. The deicing fluid within tank 28, which is at the predetermined storage temperature, is thus pumped by means of pump 30 through heat exchanging coil 26, thereby further increasing in temperature. The heated mixture is then delivered to site 34 at an elevated delivery temperature without return to tank 28.

Figure 2:
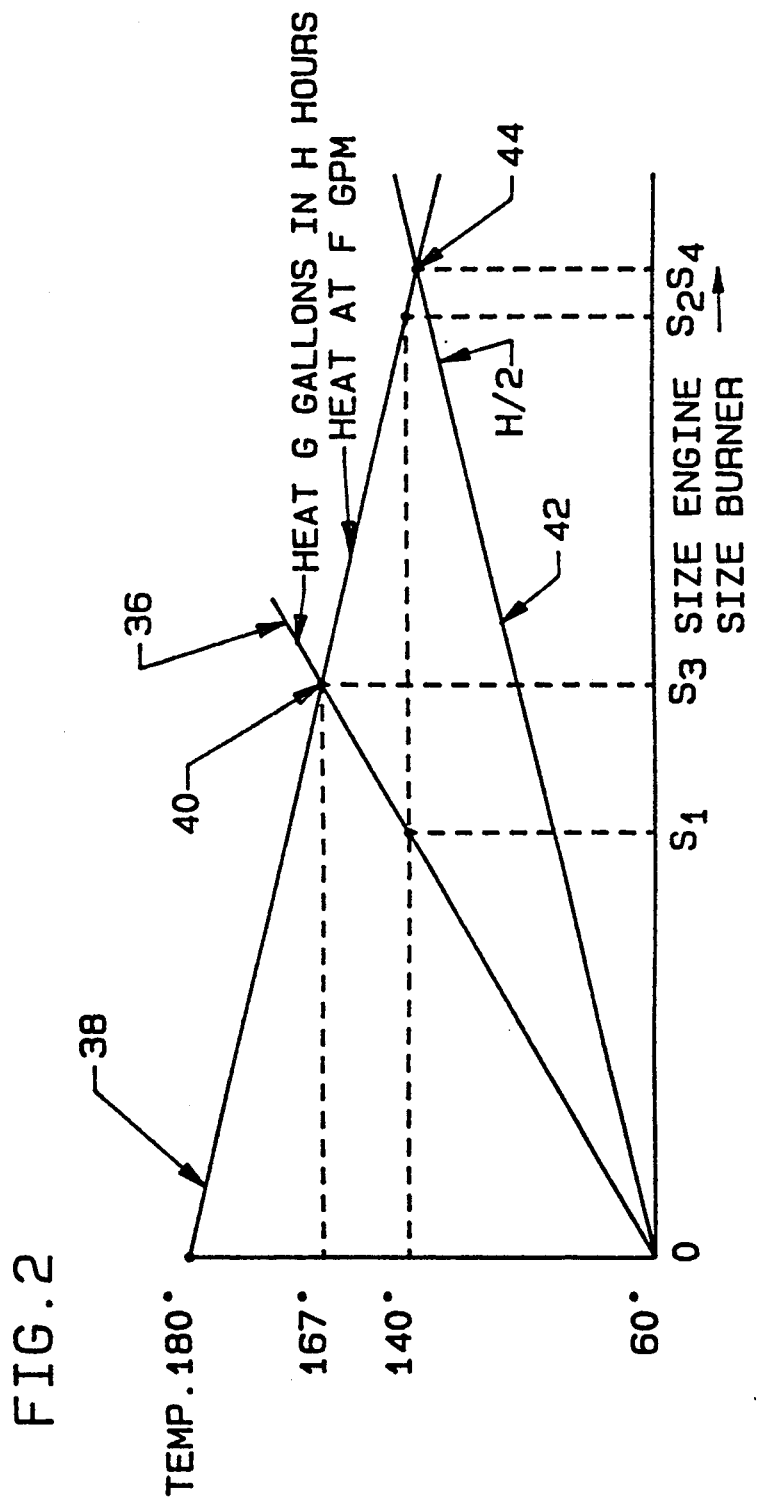
FIG. 2 is a graph depicting delivery and storage temperatures as a function of heat source size and parametric curves representative of predetermined amounts of gallons in storage and delivery rates.

Turn now to FIG. 2 wherein the graphic relationship between temperature and the size or capacity of heat source (e.g. in BTU per hour, or horsepower) is depicted in idealized terms. The vertical axis represents temperature in degrees Fahrenheit, while the horizontal axis represents a measure of heat source size, such as burner size or engine size as measured in horsepower output. In the prior art, a storage temperature was arbitrarily chosen at a fixed temperature, typically 140 degrees F. Curve 36 represents the relationship between the heat source size and temperature in order to heat a predetermined amount of gallons in a predetermined time, such as G gallons in H hours. The typical deicing unit would require the heating of 250 gallons of the deicing fluid within one-half hour. In any case, to heat G gallons in H hours to 140 degrees F. would require the heat source of size S1. S1 is thus represented as the X or horizontal coordinate corresponding to 140 degrees on curve 36.

Curve 38 represents the relationship between storage temperature and the size of the heat source in order to provide a predetermined flow rate at a delivery temperature of 180 degrees F. Typically, prior art units provide 20 gallons per minute of 180 degrees F. from a storage temperature of 140 degrees. Thus, a heat source of the size indicated by the X coordinate, S2, is required to provide the heat boost for delivery. FIG. 2 thus graphically depicts the prior art practice of providing a large heat source for quickly boosting the stored deicing fluid to the 180 degree F. delivery temperature at the required flow rate, which is very larger than is necessary to heat the deicing fluid to the storage temperature over the prescribed period of time.

For example in the specifically illustrated embodiment, stored deicing fluid must be heated to the storage temperature of 140 degress F. in order to allow delivery at 180 degrees F. at 20 gallon per minute flow rate. The alternative is to simply heat the storage tank to 180 degrees F. within the prescribed time period. However, heating and maintaining the stored deicing fluid at the elevated temperature is substantially more difficult and expensive than heating and maintaining the fluid at a lower storage temperature and then providing a large heat boost to achieve the delivery temperature, particularly in those cold environments where a deicer is required to remove snow and ice from aircraft.

However, if the storage temperature were chosen to be at or near that point of the intersection of curves 38 and 36, a single heat source, S3, could be utilized to first heat the deicing fluid to a storage temperature denoted by intersection 40 of curve 36. Then in a single pass through the same heat exchanger, as depicted in FIG. 1, the stored deicing fluid is heated and delivered at F. gallons per minute at 180 degrees F. as depicted by intersection point 40 of curve 38. In the illustrative embodiment of FIG. 2, intersection point 40 happens to be at 167 F. Clearly, intersection point 40 will depend upon the specific nature of curves 36 and 38, which in turn depends upon virtually all of the thermodynamic design factors of the equipment as diagrammatically described in connection with FIG. 1. These factors include the amount of fluid within storage tank 28, flow rates and capacities of pump 30 and heat exchanger 20, the delivery rate to site 34 through valve 32, and the cumulative thermal losses throughout the entire system depicted in FIG. 1.

Therefore, it is expressly to be understood that the size of the engine, S3, and the storage temperature corresponding to the intersection point 40 of curves 36 and 38 will vary according to the specific embodiment and conditions under which it is run.

Curve 42 of FIG. 2 defines a relationship between storage temperature and heat capacity of the single heat source of heating a predetermined amount of gallons in a decreased time interval, for example G gallons in H/2 hours. The slope of curve 42 is less than the slope of curve 36, and hence it can be readily seen that to heat a predetermined amount of deicing fluid to 140 degrees requires a substantially greater heat source than is the case with curve 36. In the event that the deicing fluid is to be heated in a time interval, H/2, the intersection of curves 42 and 38 occurs at intersection point 44. Intersection point 44 then corresponds to the heat source of capacity denoted by the X coordinate, S4. In the illustrative embodiment, the temperature of the stored deicing fluid which can be achieved even by the greater heat source S4 during a period H/2 is somewhat less than 140 degrees. However, the greater heat source capacity of S4 nevertheless still allows the deicing fluid to be heated to 180 degrees on a single pass through the heat exchanger at F gallons per minute as indicated by point 44 on curve 38. Therefore, as shown in FIG. 2, if the time period allowed for heating the deicing fluid to a storage temperature varies, the storage temperature will decrease and the capacity of the heat source will increase.

Therefore, many alterations and modifications may be made by those having ordinary skill in the art without departing from the spirit and scope of the invention.

For example, the embodiment of FIG. 1 is particularly adapted to operating over varying time periods, such as symbolized by curves 36 and 42. By appropriate setting or adjustment of back-pressure valve 16, engine 10 may be variably loaded and its heat output significantly altered. Thus, engine 10, in combination with back-pressure valve 16, may be appropriately configured to act either as a single heat source S3 or S4 in the illustration of FIG. 2, or at any value therebetween or within the range of adjustment of the system of FIG. 1.

Therefore, it is contemplated as being within the scope of the invention that variable preheating time intervals may be incorporated into the apparatus of FIG. 1 by appropriate setting of the storage temperature and back-pressure valve 16. The setting may be automatic through conventional electronic circuitry. For example, valve 16 may be arbitrarily set to determine a heat capacity within the range of engine 10 along the X coordinate of FIG. 2. The heat capacity of engine 10 as so configured through back-pressure valve 16 will establish an intersection point on curve 38. Through this intersection point will be a curve similar to curves 36 and 42 defined by an appropriate parameter, H, relating to the time period required to heat the deicing fluid to the temperature indicated by the Y coordinate of the intersection point on curve 38 as depicted in FIG. 2. That point will automatically just equal the temperature increment through which the deicing fluid will be heated in a single pass through heat exchanger 20. The entire system is therefore self adjusted. The heating and maintaining of the temperature of the deicing fluid within storage tank 28 at the storage temperature, whatever it may be, may be determined by circuitry within heat exchanger 20. For example, a thermister at the input and output of coil 26 will each record a temperature which may be differenced to generate that temperature increment by which the deicing fluid is heated on the single pass through exchanger 20 at any given setting of back-pressure valve 16. The measured temperature increment is therefore subtracted from the delivery temperature, e.g. 180 degrees F., to derive the desired storage temperature. Engine 10 is then operated at the given setting of valve 16 until the calculated storage temperature is achieved within tank 28. Thereafter, the thermostatic control of engine 10 turns engine 10 on and off in order to maintain the deicing fluid within storage tank 28 at the computed storage temperature. Regardless of what the valve setting of back-pressure valve 16 may be, the storage temperature will be appropriately chosen so that the deicing fluid will be delivered to the utilization site at the desired delivery temperature by a single pass through heat exchanger 20.

Furthermore, it is also contemplated that foaming or aerating the deicing fluid may be practiced to increase deicing efficiency. For example, the water-glycol mixture, which tends to form a more viscous and sticky fluid when aerated, will be purposely agitated or aerated in the system of FIG. 1 by conventional means. Such means may include an air pump feeding an aerating device disposed in tank 28, or may include a design wherein pump 30 is chosen and designed to severely cavitate and ingest air. It is expected according to the invention that the foamed deicing fluid will then have a tendency to stick to the aircraft surfaces to a greater extent. As a result, once the heated fluid removes any built-up ice or snow, the sticky deicing residue on the aircraft will, because of its presence, lower the melting point of any subsequent ice or snow which may fall onto the aircraft. The foamed fluid is not so sticky, however, as to materially interfere with flight characteristic of the aircraft or to resist removal by normal air drag once the aircraft begins to accelerate to flight speeds.

Figure 3:
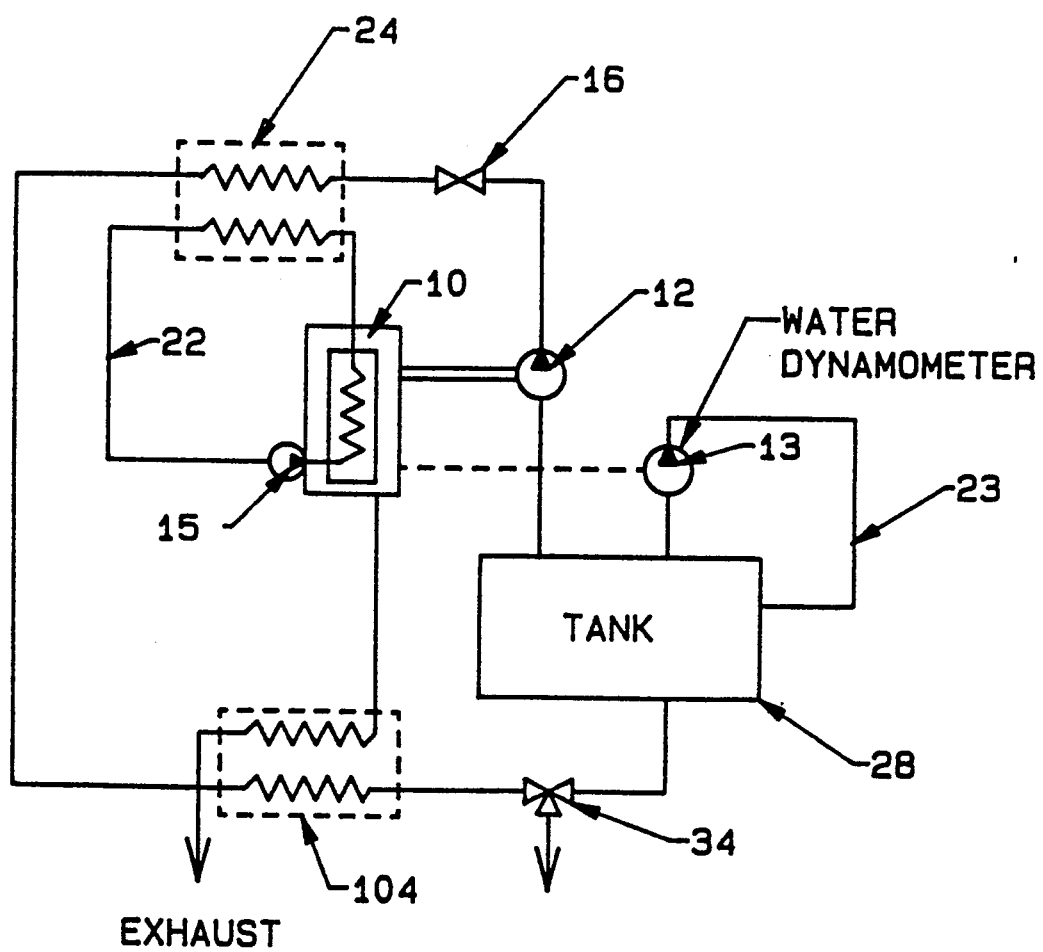
FIG. 3 is a diagrammatic depiction of another embodiment of the circulating system of the type described in connection with FIG. 2.

FIG. 3 is a diagrammatic depiction of a nonfired circulating system wherein engine 10 drives a pump 12 which is used to circulate the deicing fluid from tank 28. The deicing fluid is pumped against a back-pressure valve 16 which serves to load engine 10 at least in part. As before water jacket heat from engine 10 is transferred to the circulating deicing fluid through heat exchanger 24. Engine coolant is circulated to heat exchanger 24 by means of coolant pump 15 and its associated circulating loop 22. Similarly, heat from the exhaust gases of engine 10 are recovered by means of exhaust heat exchanger 104 which thermally couples the heat from the exhaust gases to the circulating deicing fluid. The heated deicing fluid can be delivered to the application site by appropriately opening three-way valve 34.

In the embodiment of FIG. 3 it is expressly contemplated that the capacity of pump 12 and its hydraulic circuit are limited in various ways due to considerations of economics or particality. Therefore, it is contemplated that the amount of heat which is required from engine 10 can not be produced by loading engine 10 only by means of pump 12 and back-pressure valve 16. Therefore, engine 10 is used to drive another hydraulic loading device, such as a inefficient hydraulic load device 13, such as a dynamometer, inefficient pump or fluidic brake. Hydraulic load device 13 recirculates deicing fluid through tank 28 in a separate circuit 23. In the process of circulating the deicing fluid, hydraulic load device 13 provides an increased load to engine 10 which is essentially all converted into heat which is transferred into the deicing fluid circulated through hydraulic load device 13. In this way, a light duty pump 12 and associated circuit may be teamed with additional hydraulic loads so that engine 10 is loaded enough to provide the amount of heat to heat the required amount of deicing fluid to the required temperature in the required time.

Figure 4:
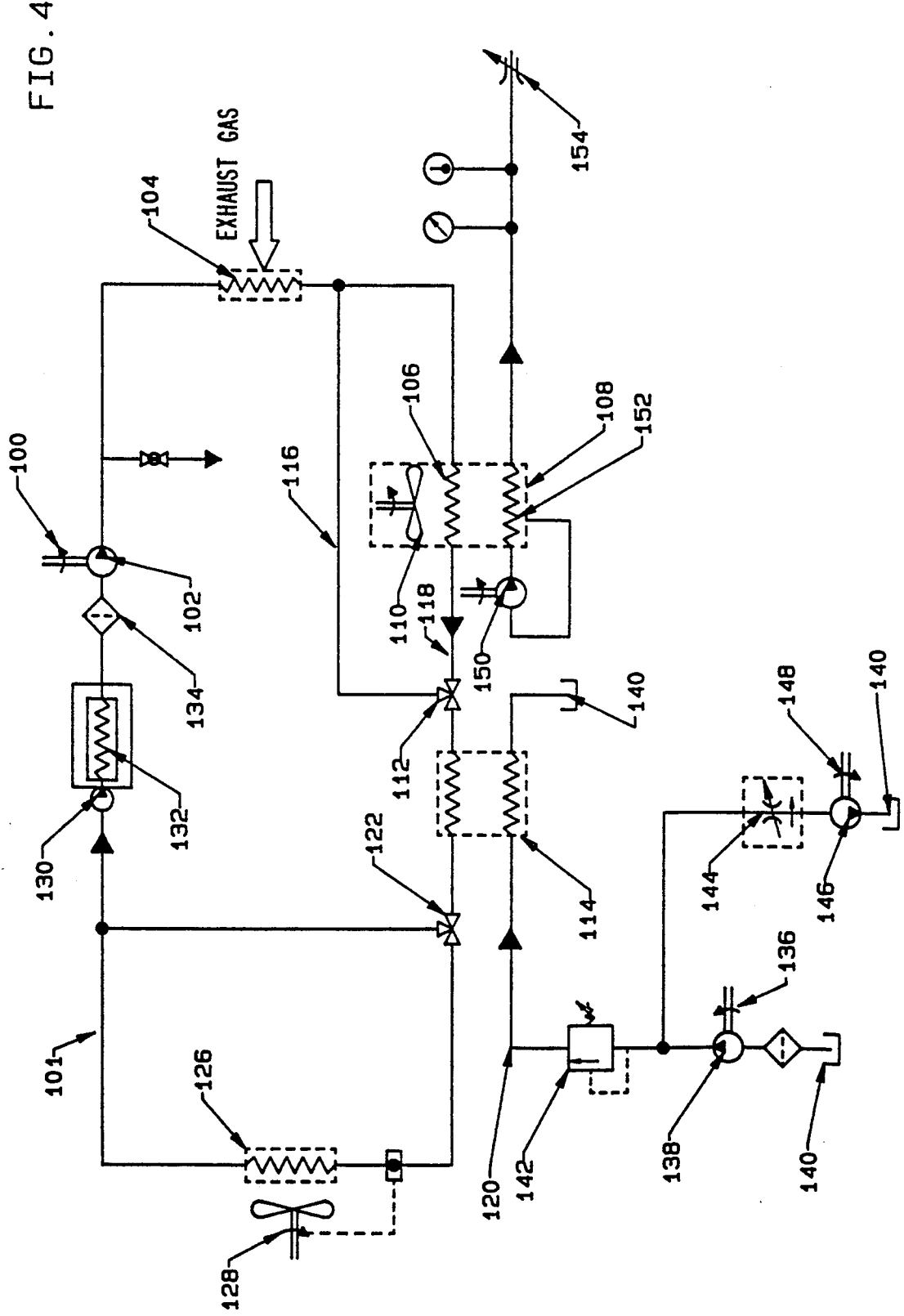
FIG. 4 is a schematic of an embodiment of the invention wherein the deicing fluid is noncirculating or substantially noncirculating.

FIG. 4 is a schematic diagram of yet another embodiment wherein the deicing fluid is noncirculating or otherwise noncirculating in the heat exchange loop in the sense described below. An engine or other motive source of some type (not shown) is coupled to a driveshaft 100 which turns a hydraulic pump 102. The illustrated embodiment utilizes 150 horsepower engine. Pump 102, here a 40 gpm pump, provides a fluid, such as hydraulic fluid or other heat exchanging medium, such as engine coolant, to a first heat exchanger diagrammatically denoted by reference numeral 104. The fluid entering the heat exchanger is approximately 205 degrees. F. Heat exchanger 104 is provided with the hot exhaust gases from the diesel engine or other motive source used to drive pump 102. Heat from the exhaust gases, which is in the illustrated embodiment at approximately 870 degrees F., is transferred within heat exchanger 104 to the heat exchanging fluid.

The heat exchanging fluid exits from heat exchanger 104 at approximately 220 degrees F. to enter an in-tank heat exchanger 106 physically included within or otherwise disposed in a functional thermal relationship within storage tank 108. Storage tank 108 includes the noncirculating or deicing fluid. If desired, the deicing fluid may be gently stirred by a paddle mechanism, diagrammatically depicted by reference numeral 110, to increase heat exchange efficiency within tank 108. Many other means may be devised for increasing the heat exchanging efficiency within tank 108 without departing from the spirit and scope of the invention.

In the illustrated embodiment the deicing fluid within tank 108 is brought from approximately 60 degrees F. or ambient within 65 minutes to approximately 163 degrees F.

The heat exchanging fluid continues to flow from heat exchanger 106 within tank 108 through a T-valve 112 to heat exchanger 114. T-valve 112 may be a thermostatically operated valve which is coupled through its other input to bypass line 116. The input to bypass line 116 in turn is coupled to the output of heat exchanger 104. Therefore, when sufficient heat has been delivered to the deicing fluid within tank 108, thermostatic valve 112 is automatically activated to close line 118 communicating with heat exchanger 106 within tank 108 and to open bypass line 116. Valve 112 is designed in the illustrated embodiment to switch at approximately 173 degrees F.

In either case the fluid flows from valve 112 into heat exchanger 114 which provides a heat exchanging relationship between the fluid in a hydraulic circuit, generally denoted by reference numeral 101, with hydraulic fluid or heat carrying fluid within a engine loading circuit, generally denoted by reference numeral 120.

Hydraulic circuit 120 will be described in greater detail below, however for the moment continue to consider hydraulic circuit 101. Fluid enters heat exchanger 114 at approximately 173 degrees F. It exits at approximately 192 degrees F. The output of heat exchanger 114 is coupled to a thermostatically controlled valve 122. According to a predetermined temperature, the output of fluid from valve 122 either flows through a bypass line 124 or is provided to a radiator 126. Radiator 126 may also be used with a thermostatically controlled fan 128 which is diagrammatically depicted in FIG. 4. Depending upon whether the heat within circuit 101 exceeds the preset temperature of valve 122, namely approximately 192 degrees F., the fluid will be circulated either through radiator 126 or bypass line 124. In this manner, the fluid flowing into pump 130 downstream from bypass line 124 and radiator 126 will be maintained at or below a preset temperature.

Pump 130 may be included as a boost pump and is typically part of the water cooling system of the diesel engine (not shown) used as the motive and heat source for the system of FIG. 4. The heat exchanging medium or water is then circulated through the water cooling system of the diesel which is diagrammatically depicted as heat exchanger 132 in the illustration of FIG. 4. The water cooling system of the diesel may also be optionally filtered by means of a coolant filter 134 before reentering the 40-gallon-per-minute hydraulic pump 102.

However, simply running the diesel engine in a system which would include only circuit 101 does not provide the power required to heat the icing fluid to the desired temperatures within the required time periods. Therefore, the diesel engine is loaded by means of hydraulic circuit 120. Turning now to hydraulic circuit 120 as depicted in FIG. 4, the diesel engine is mechanically coupled through shaft 136 to a hydraulic pump 138. Hydraulic pump 138 may be open-looped in that it takes its input from a filtered sump 140. The output of hydraulic pump 138 is coupled to an adjustable back-pressure valve 142. The output of pump 138 may also be coupled through a constant speed regulator valve 144 and to a pump motor 146 mounted at each of the four wheels of a vehicle in which the system of FIG. 4 is included. The wheels of the vehicle are thus driven by pumps 146 which is diagrammatically denoted in FIG. 4 as a single pump through wheel shafts 148. Fluid from the output of pump motor 146 is then communicated to sump 140 or a sump in fluidic communication therewith.

Meanwhile, the hydraulic fluid is heated by the work done on the fluid by pump 138 against valve 142 so that heated hydraulic fluid at approximately 204 degrees F. is supplied to heat exchanger 114. Heat from hydraulic fluid of circuit 120 is thus coupled through heat exchanger 114 to the hydraulic heat exchanging fluid within circuit 101. Fluid in circuit 120 exits heat exchanger 114 and is returned to the sump 140 or a sump in fluidic communication therewith.

What has thus far been described is a nonfired mobile system for heating a deicing fluid which is maintained within a storage tank. The heated deicing fluid may be directly pumped from tank 108 to the utilization site, i.e., aircraft wings or surface or may be subjected to a last pass heat exchange. In the case as depicted in FIG. 4, where the deicing fluid is subjected to last pass heat exchange, the diesel engine also drives a pump 150 whose input is coupled to the deicing fluid within tank 108. The output of pump 150 is coupled through a heat exchanger 152, which is shown in the illustrated embodiment as within tank 108 and in a heat exchanging relationship with heat exchanger 106. The deicing fluid is thus pumped in a single pass from tank 108, through pump 150 and heat exchanger 152 to the utilization site.

In the illustrated embodiment delivery is effected through a hose with an adjustable nozzle 154. Again, in the illustrated embodiment the system of FIG. 4 is designed to produce approximately 85 gallons per minute maximum flow rate of deicing fluid at approximately a maximum temperature of 185 degrees F.

It should be clearly understood that the various flow rates, engine capacities, temperatures and other parameters discussed in connection with FIG. 4 may be varied by those having ordinary skill in the art without departing from the spirit and scope of the invention. For example, if a higher horsepower engine than 150 hp were used, specified temperatures could be reached within a shorter period of time. Similarly, if the main hydraulic circuit 101 used not 40-gallon-per-minute pump 102 but a 60-gallon-per-minute pump, the flow rates and temperatures cited in connection with circuit 101 would likewise change.

Figure 5:
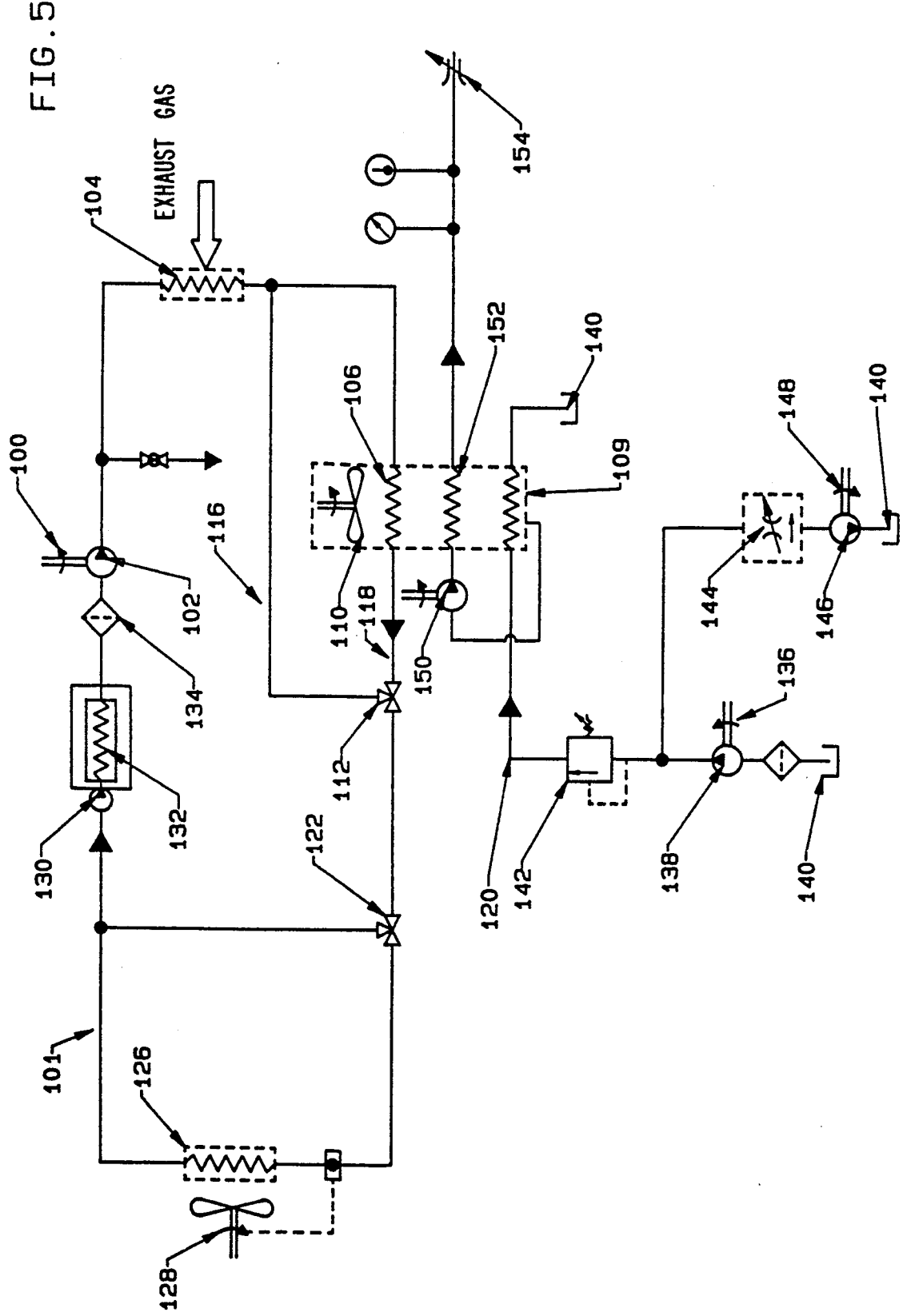
FIG. 5 is a schematic diagram of another noncirculating embodiment of the invention wherein heat exchange to the deicing fluid from the loading hydraulic circuit is made by a heat transfer from a hydraulic heat exchanger within the deicing fluid storage tank.

Still further, it must be clearly understood that modifications may be made by those having ordinary skill in the art of details of the structural relationship of the various heat exchanging elements without departing from the scope of the invention. For example, instead of having the hydraulic heat exchanger 114 exterior to tank 108 it could be included within tank 108 in the same manner as heat exchanger 152 or in lieu thereof, in heat exchanging relationship with heat exchanger 106 and the deicing fluid within the tank. FIG. 5 depicts an embodiment where such a modification has been effected. The operation of the system in FIG. 5 is functionally analogous to that of FIG. 4 wherein like elements are referenced by like numerals. It may be readily appreciated that the principal difference between the embodiment of FIGS. 4 and 5 is the deletion of heat exchanger 114 from FIG. 4 and the inclusion of a corresponding heat exchanging element 109 in tank 108. Thus heat from hydraulic circuit 120 may be equivalently transferred directly to the deicing fluid in tank 108.

Figure 6:
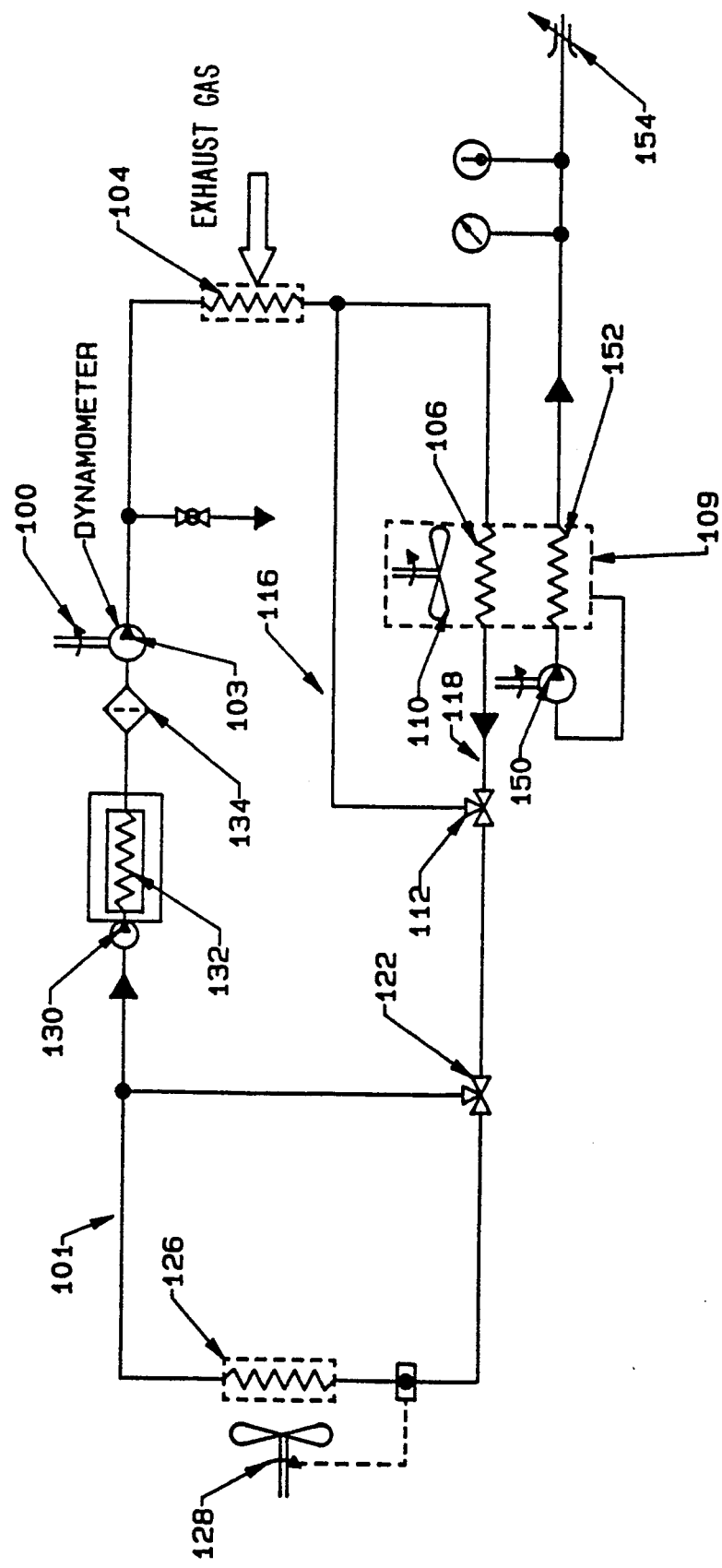
FIG. 6 is a schematic diagram of still another noncirculating embodiment of the invention wherein the engine is loaded with an inefficient hydraulic load device and there is no hydraulic circuit.

FIG. 6 depicts another embodiment of a noncirculating system similar to that described in connection with FIG. 5. The embodiment of FIGS. 5 and 6 are identical, except that pump 102 has been removed and replaced by a fluidic brake or inefficient hydraulic load device 103, and the entire hydraulic circuit 120 and its associated components have also been deleted. In the embodiment of FIG. 6 the entire load on engine 10 is provided by hydraulic load device 103. In FIG. 6 hydraulic load device 103 has been included in the engine coolant circuit and is driven by engine 10. However, a separate heat exchanging circuit could be provided between hydraulic load device 103 and tank 109 if desired Therefore, it must be clearly understood that many modifications and alterations may be made by those having ordinary skill in the art without departing from the spirit and scope of the invention. For example, a back-pressure valve and an inefficient hydraulic load device have been shown as being used alone or in combination to provide a hydraulic load for the engine. It is to be expressly understood that any other hydraulic load device, now known or later devised, could be utilized as well according to the invention. The illustrated embodiment has been set forth only for the purposes of example and not as limiting the invention which is defined in the following claims.

We claim:

1. An apparatus for providing a heated deicing fluid comprising:
   a nonfired heat source characterized by a minimum operating temperature;
   an unresupplied storage tank for storing noncirculating deicing fluid;
   a heat exchanger for transferring heat from said heat source into said deicing fluid, said heat exchanger in a heat exchanging relationship with said deicing fluid; and
   means for circulating a heat exchanging fluid from said nonfired heat source to said heat exchanger,
   means for controlling heat transfer into said deicing fluid to maintain said heat source at or above said minimum operating temperature while heat is being transferred into said deicing fluid via said heat exchanger,
   whereby said nonfired heat source is utilized in said apparatus as a single heat source wherein said deicing fluid is heated within said storage tank without requiring pumping of said deicing fluid in order to heat said deicing fluid in said apparatus.

2. The system of claim 1 where said means for controlling heat transfer comprises means for controlling the amount of heat transferred into said deicing fluid to leave sufficient heat in said heat exchanging fluid to maintain said engine temperature at or above a predetermined temperature, said predetermined temperature being a minimum operating temperature of said nonfired heat source.

3. The system of claim 1 where said means for controlling heat transfer comprises means for diverting a controlled portion of said heat transfer fluid from said heat exchanger so that sufficient heat is retained within said nonfired heat source to maintain said nonfired heat source at a temperature at or above a minimum operating temperature.

4. The system of claim 3 where said means for diverting comprises a thermostatically controlled diverting valve at an input to said heat exchanger to bypass a selected amount of heat exchanging fluid around said heat exchanger and to return said selected amount to heat exchanging relationship with said nonfired heat source.

5. The system of claim 1 wherein said nonfired heat source is an engine and further comprising means for loading said engine to increase heat generated by said engine.

6. The system of claim 5 where said means for loading said engine comprises a hydraulic load coupled to said engine.

7. The system of claim 6 where said hydraulic load coupled to said engine comprises a back pressure valve coupled to the output of said pump for pumping said heat transfer fluid.

8. A method for supplying a noncirculating deicing fluid to a utilization site at a predetermined delivery temperature without deicing fluid resupply comprising the steps of:
   heating a heat exchanging fluid by a nonfired heat source;
   circulating said heat exchanging fluid through a heat exchanger within a storage tank containing a fixed quantity of said noncirculating deicing fluid;
   heating said deicing fluid by said heat exchanging fluid being recirculated through said heat exchanger; and
   maintaining said nonfired heat source at or above a predetermined temperature to avoid overcooling said nonfired heat source while said fixed quantity of deicing fluid is being heated.

9. The method of claim 8 where said step of maintaining said nonfired heat source at a predetermined temperature at or above a predetermined temperature comprises the step of controlling the amount of heat transferred into said deicing fluid to leave sufficient heat in said heat exchanging fluid to maintain said predetermined temperature at or above a minimum operating temperature of said nonfired heat source.

10. The method of claim 9 where said step of diverting is controlled by thermostatically controlling a diverting valve at an input to said heat exchanger to bypass a selected amount of heat transfer fluid around said heat exchanger and to return said selected amount to heat exchanging relationship with said nonfired heat source.

11. The method of claim 8 wherein said heat source is an engine and further comprising the step of loading said engine to increase heat generated by said engine.

12. The method of claim 11 where said step of loading said engine is performed by coupling a hydraulic load to said engine.

13. The method of claim 12 where said step of coupling said hydraulic load to said engine comprises the step of providing a back pressure valve in the output of said pump for pumping said heat transfer fluid.

14. The method of claim 8 where in said step of heating said deicing fluid with said nonfired heat source, said deicing fluid is heated by heat rejection from an internal combustion engine, said internal combustion engine being loaded by a hydraulic device to produce a predetermined amount of heat.

15. A method for heating a fixed quantity of unresupplied, noncirculating deicing fluid with an internal combustion engine including a water coolant system comprising the steps of:
   storing said fixed predetermined quantity of unresupplied noncirculating deicing fluid within a storage tank;
   driving a fluidic load device by said engine to cause said engine to produce power at a predetermined level sufficient to load said engine to heat said predetermined quantity to a predetermined temperature within a predetermined time;
   coupling heat from said coolant system of said engine into said deicing fluid within said storage tank simultaneously with driving said fluidic load device by said engine; and
   simultaneously maintaining said engine at or above a predetermined temperature to avoid overcooling said engine while said fixed quantity of deicing fluid is being heated.

16. A nonfired system for heating a fixed quantity of unresupplied noncirculating deicing fluid comprising:
   an internal combustion engine;
   a storage tank for storing said fixed quantity of unresupplied noncirculating deicing fluid;
   a fluidic circuit provided with a recirculation fluid;
   means within said fluidic circuit for loading said engine;
   heat exchanger means for transferring heat from said recirculating fluid in said fluidic circuit and said engine to said noncirculating deicing fluid; and
   means for maintaining internal combustion engine at or above a predetermined temperature to avoid overcooling said engine.

17. The nonfired system of claim 16 where said means for loading said engine comprises a hydraulic pump driven by and coupled to said engine and a back-pressure valve in circuit with said hydraulic pump, and wherein said fluidic circuit is a hydraulic circuit and said recirculating fluid is hydraulic fluid.

18. The nonfired system of claim 16 where said engine includes and engine coolant circuit, said means for loading said engine comprises an inefficient hydraulic load device driven by and coupled to said engine, wherein said fluidic circuit is coupled to said engine coolant circuit and wherein said recirculating fluid is engine coolant.

19. The nonfired system of claim 16 where said engine includes and engine coolant circuit, said means for loading said engine comprises a pump driven by and coupled to said engine and a backpressure valve in circuit with said pump, wherein said fluidic circuit is coupled to said engine coolant circuit and wherein said recirculating fluid is engine coolant.

20. The nonfired system of claim 16 where said engine is cooled by engine coolant, wherein said heat exchanger means for transferring heat from said engine to said noncirculating deicing fluid comprises an engine coolant heat exchanger disposed in said storage tank supplied with said engine coolant.

21. The nonfired system of claim 20 wherein said heat exchanger means comprises an exhaust heat exchanger for transferring heat from gas exhaust from said engine into said engine coolant, said engine coolant being provided to said engine coolant heat exchanger in said storage tank.

22. The nonfired system of claim 16 wherein said recirculating fluid is hydraulic fluid, said engine is cooled by engine coolant, and heat exchanger means for transferring heat from said recirculating fluid to said noncirculating deicing fluid comprises a heat exchanger for providing a heat exchanging relationship between said hydraulic fluid and said engine coolant, said engine coolant transferring heat picked up from said hydraulic fluid into said noncirculating deicing fluid through said heat exchanger means.

23. The nonfired system of claim 16 wherein said recirculating fluid is hydraulic fluid, wherein said means for loading said engine is in circuit with said fluidic circuit and wherein said heat exchanger means comprises a hydraulic heat exchanger disposed in said noncirculating deicing fluid within said storage tank and directly thermally coupled to said noncirculating deicing fluid.

* * * * *